Patented Aug. 22, 1939

2,170,401

UNITED STATES PATENT OFFICE 2,170,401

PROCESS FOR PREPARING ALKYL SULPHATES

Egi V. Fasce and John J. Owen, Baton Rouge, La., assignors to Standard Oil Development Company, a corporation of Delaware No Drawing. Application November 29, 1935, Serial No. 52,200

2 Claims. (Cl. 260—459)

This invention relates to an improved process for preparing alkyl sulphates, and more particularly to the preparation of improved alkyl sulphate detergents from secondary and tertiary fatty alcohols of more than 8 carbon atoms. This invention is especially applicable to the sulphation of alcohols obtained from the limited oxidation of paraffinic and naphthenic hydrocarbons, such as paraffin wax, petrolatum and viscous naphthenic oils of high purity.

Fatty alcohols are reacted with strong sulphuric reagents, such as chlorsulphonic acid, to prepare alkyl sulphates, which are neutralized with alkali metal bases to prepare the corresponding salts, which are highly effective detergents in both hard, soft, and sea water. An example of such detergents is sodium lauryl sulphate.

The reaction of the alcohol and chlorsulphonic acid is usually conducted at room or higher temperatures, and it has been considered necessary to conduct the reaction in the presence of a suitable material for decreasing the action of the chlorsulphonic acid in order to avoid objectionable side reactions involving oxidation, dehydration, and polymerization, which cause the formation of inferior products. The material preferred for this purpose is diethyl ether, which forms an addition compound with the chlorsulphonic acid and greatly decreases its activity. The use of ether, however, involves serious hazards because of its ready inflammability and danger to operators.

It has now been discovered that chlorsulphonic acid may be used alone, without the necessity of any activity retarding agent, if the temperature of the reaction is maintained continuously below that at which the undesirable side reactions become appreciable. Under such conditions the hazards accompanying the use of diluents, such as ether, are avoided, and the detergents obtained are superior to those produced from the same stock at higher temperatures with diluents for the chlorsulphonic acid. This improved low temperature process is particularly suitable for the sulphation of mixtures of alcohols, such as are obtained on limited oxidation of paraffin wax, and for the sulphation of secondary and tertiary fatty alcohols generally. The preferred alcohols may be described as aliphatic alcohols having a chain of 8 to 25 carbon atoms, and having the hydroxyl group attached to a secondary or tertiary carbon atom thereof; that is, to a carbon atom situated between the ends of the chain.

Improved detergents are prepared from alcohols having a chain of about 10 to 18 carbon atoms, and improved sudsing agents from alcohols having a chain of about 10 to 14 carbon atoms. Still other fractions of the alcohols may also be separately treated.

The following example is presented to illustrate a suitable method for conducting the process of this invention, but is not to be construed as limiting this invention in any way:

Example I

A purified mixture of alcohols was prepared from the unsaponified fraction of the products obtained on limited oxidation of petrolatum. The crude unsaponified fraction was extracted with aqueous methyl alcohol (93% strength) and the oxy-organic fractions thus concentrated in the extract were hydrogenated to reduce ketones and aldehydes to alcohols. Hydrogenation catalysts such as nickel may be used for this treatment with hydrogen under suitable conditions of temperature and pressure, for example at temperatures of 150–300° C. or higher, and pressures of 30 to 150 atmospheres, to effect the desired reduction. The hydrogenated product consisted largely of secondary and tertiary aliphatic alcohols of about 8 to 25 carbon atoms.

This purified mixture of alcohols was then dissolved in two volumes of a light, acid-inert, petroleum naphtha, and the solution was then cooled to 0° C. The theoretical quantity of pure concentrated chlorsulphonic acid (Eastman Kodak's "practical grade"), based on hydroxyl number of the mixture of alcohols, was then added slowly with vigorous stirring and cooling to maintain a temperature of 0° C. The addition of acid was completed in 16 minutes and, after 10 minutes additional stirring at 0° C., the mixture was neutralized by passing it, with stirring and cooling, into a 10% aqueous solution of caustic soda in slight excess. The temperature was not permitted to rise above 25° C. during the neutralizing operation.

The crude soap solution thus obtained was extracated with a light petroleum naphtha to remove unsulphated organic material and the raffinate was then evaporated to a paste on a steam bath, adding at the start about 4% of trisodium phosphate (based on dry soap) to maintain a definitely alkaline pH during the evaporation and thus prevent decomposition of the sulphated soap product. The crude soap was finally dried under a vacuum of 2.3 mm. mercury absolute pressure at room temperature (70–80° F.) for about 24 hours.

The dry soap thus obtained was tested for sudssing and detergency properties according to standardized procedure.

Example II

A portion of the same purified mixture of alcohols used for the sulphation test described above was sulphated at 20–22° C. with a theoretical amount of chlorsulphonic acid diluted with diethyl ether, and the sulphated soap product was recovered and dried and tested in the same manner used above.

The soap obtained in Example I showed sudsing properties 30% better than those of the soap obtained in Example II. A concentration of 0.115% of the soap of Example I gave satisfactory cleansing, while a minimum concentration of 0.142% of the soap of Example II was required to secure the same effectiveness in cleansing.

While a maximum reaction temperature for the sulphation step of 0° C. is shown in the above example, much lower temperatures may be used and greater yields are ordinarily obtained at the lower temperatures. A larger volume of solvent for the alcohols is generally necessary at the lower temperatures in order to prevent their solidification.

This invention is not to be limited to any specific examples or explanations, all of which are presented herein solely for purpose of illustration, but is to be limited only by the following claims, in which it is desired to claim all novelty insofar as the prior art permits.

We claim:

1. Process for preparing alkyl sulphates comprising bringing an alcohol having a chain of about 8 to 25 carbon atoms, said alcohol selected from the group consisting of aliphatic secondary monohydric alcohols and aliphatic tertiary monohydric alcohols, into contact with concentrated chlorsulphonic acid, and in which the reaction time for the sulfation reaction is not more than about fifteen minutes at a reaction temperature below 0° C.

2. Process for preparing alkyl sulphates comprising bringing an alcohol having a chain of about 14 to 16 carbon atoms, said alcohol selected from the group consisting of aliphatic secondary monohydric alcohols and aliphatic tertiary monohydric alcohols, into contact with concentrated chlorsulphonic acid, and in which the reaction time for the sulphation reaction is not more than about fifteen minutes at a reaction temperature below 0° C.

EGI V. FASCE.
JOHN J. OWEN.